United States Patent
Mappouras et al.

(10) Patent No.: US 11,494,087 B2
(45) Date of Patent: Nov. 8, 2022

(54) TOLERATING MEMORY STACK FAILURES IN MULTI-STACK SYSTEMS

(71) Applicant: Advanced Micro Devices, Inc., Santa Clara, CA (US)

(72) Inventors: Georgios Mappouras, Durham, NC (US); Amin Farmahini Farahani, Santa Clara, CA (US); Michael Ignatowski, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 229 days.

(21) Appl. No.: 16/175,926

(22) Filed: Oct. 31, 2018

(65) Prior Publication Data
US 2020/0133518 A1    Apr. 30, 2020

(51) Int. Cl.
*G06F 3/06* (2006.01)

(52) U.S. Cl.
CPC .......... *G06F 3/0619* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 6,148,348 A | * | 11/2000 | Garnett | G06F 11/1641 710/14 |
| 8,984,368 B2 | | 3/2015 | Loh et al. | |
| 2006/0212622 A1 | * | 9/2006 | Porat | G06F 12/0866 710/62 |
| 2012/0117444 A1 | * | 5/2012 | Arya | G06F 11/108 714/763 |

(Continued)

FOREIGN PATENT DOCUMENTS

WO    02091382 A2    11/2002

OTHER PUBLICATIONS

Georgios Mappouras, Alireza Vahid, Robert Calderbank, Derek R. Hower and Daniel J. Sorin; "Jenga: Efficient Fault Tolerance for Stacked DRAM"; 2017 IEEE 35th International Conference on Computer Design; Nov. 5, 2017; Boston, Massachusetts; United States, 8 pages.

(Continued)

*Primary Examiner* — Charles Rones
*Assistant Examiner* — Jonah C Krieger
(74) *Attorney, Agent, or Firm* — Polansky & Associates, P.L.L.C.; Paul J. Polansky; Nathan H. Calvert (57) ABSTRACT

Memory management circuitry and processes operate to improve reliability of a group of memory stacks, providing that if a memory stack or a portion thereof fails during the product's lifetime, the system may still recover with no errors or data loss. A front-end controller receives a block of data requested to be written to memory, divides the block into sub-blocks, and creates a new redundant reliability sub-block. The sub-blocks are then written to different memory stacks. When reading data from the memory stacks, the front-end controller detects errors indicating a failure within one of the memory stacks, and recovers corrected data using the reliability sub-block. The front-end controller may monitor errors for signs of a stack failure and disable the failed stack.

20 Claims, 7 Drawing Sheets

(56) References Cited

U.S. PATENT DOCUMENTS

| | | | |
|---|---|---|---|
| 2014/0108885 A1* | 4/2014 | Loh | G06F 11/1044 714/763 |
| 2017/0344421 A1 | 11/2017 | Brandl | |
| 2018/0137005 A1* | 5/2018 | Wu | G11C 11/4093 |

OTHER PUBLICATIONS

Prashant J. Nairt, David A. Roberts and Moinuddin K. Qureshi; "Citadel: Efficiently Protecting Stacked Memory From Large Granularity Failures"; 2014 47th Annual IEEE/ACM International Symposium on Microarchitecture; Dec. 13, 2014; Cambridge, United Kingdom; 7 pages.

Xun Jian, Vilas Sridharan, Rakesh Kumar; "Parity Helix: Efficient Protection for Single-Dimensional Faults in Multi-dimensional Memory Systems"; 2016 IEEE International Symposium on High Performance Computer Architecture (HPCA); Mar. 12, 2016; Barcelona, Spain; 13 pages.

Hsing-Min Chen, Carole-Jean Wu, Trevor Mudge and Chaitali Chakrabarti; "RATT-ECC: Rate Adaptive Two-Tiered Error Correction Codes for Reliable 3D Die-Stacked Memory"; Transactions on Architecture and Code Optimization; vol. 13; Issue 3; Sep. 1, 2016; Arizona State University; 24 pages.

Hyeran Jeon, Gabriel H. Loh, and Murali Annavaram; "Efficient RAS Support for Die-stacked DRAM"; 2014 International Test Conference; Oct. 20, 2014; Seattle, Washington; United States; 10 pages.

David A. Patterson, Garth Gibson and Randy H. Katz; "A Case for Redundant Arrays of Inexpensive Disks (RAID)"; white paper; Computer Science Division; Department of Electrical Engineering and Computer Sciences; University of California; Berkeley, California; United States; 1988; 8 pages.

\* cited by examiner

Mapping_Function (Ro, Ba, St, Ch, Co){
  Address1 = Ro, Ba, St, Ch, Co;
  Address2 = Ro, Ba, (St+1)mod4, Ch, Co+1;
  Address3 = (Ro)div2, Ba_total*2/3+(Ba)div2, (St+1)mod4, Ch, (Co)div2;
  return Address1, Address2, Address3;
}
```

TOLERATING MEMORY STACK FAILURES IN MULTI-STACK SYSTEMS

STATEMENT REGARDING FEDERALLY SPONSORED RESEARCH OR DEVELOPMENT

This invention was made with Government support under Pathforward Project with Lawrence Livermore National Security (Prime Contract No. DE-AC52-07NA27344, Subcontract No. B620717) awarded by DOE. The Government has certain rights in this invention.

BACKGROUND

Stacked memory refers to designs in which memory chips are assembled in a stack, vertically atop one another. Current stacked dynamic random-access memory (DRAM) designs include the Hybrid Memory Cube (HMC) and High Bandwidth Memory (HBM), and these designs are attractive for many applications. The appeal of three-dimensional (3D) stacked DRAM is its ability to deliver far greater memory bandwidth to processors that need it. However, stacked DRAM comes with new challenges. First, the stacking introduces new error models, including the potential failure of through silicon vias (TSVs) and failure of a chip in the stack (whose failure has a different impact than the failure of a DRAM chip in traditional two-dimensional (2D) DRAM). Second, the traditional solution to DRAM errors—Hamming error correcting codes (ECC) with the error correcting bits on a dedicated DRAM chip—are a poor fit in 3D stacked DRAM.

In order to maximize the benefits of the stacked arrangement, multiple stacks are sometimes connected to a single compute unit, such as a graphics processing unit (GPU), creating a stack group. However, a failure in any of those stacks during the life of a product can result to substantial capacity loss, bandwidth loss, and data loss that can result in significant reliability and performance overheads. Replacing the faulty HBM stack on a silicon interposer is practically impossible.

The current second-generation HBM standard (HBM2) introduces stack memory that has data-co-located ECC syndrome bits. In other words, the ECC is located at the same memory location as the data. The ECC is checked and generated by the memory controller. Although this option is good in terms of energy efficiency, it provides weak fault tolerance. In the case of a high granularity failures, like row, bank, channel, die or stack failure the memory is often unable to recover, resulting in significant amount of data loss.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory system includes a random-access memory with a plurality of memory stacks, each having a plurality of stacked random-access memory integrated circuit dies, and a memory controller. The memory controller is connected to the random-access memory and receives a block of data for writing to the memory stacks, divides the block of data into a plurality of sub-blocks, and creates a reliability sub-block based on the plurality of sub-blocks. The memory controller causes the plurality of sub-blocks and the reliability sub-block each to be written to a different one of the memory stacks. In response to read requests, the memory controller causes the plurality of sub-blocks to be read from the plurality of memory stacks and detects an error therein indicating a failure within one of the memory stacks. In response to detecting the error, correct data is recovered based on the reliability sub-block.

A method of managing memory access includes receiving a block of data for writing to a random-access memory, dividing the block of data into a plurality of sub-blocks, and creating a reliability sub-block based on the plurality of sub-blocks. The plurality of sub-blocks and the reliability sub-block are each written to different ones of a plurality of memory stacks, each memory stack including a plurality of stacked random-access memory integrated circuits. The plurality of sub-blocks are read from the plurality of memory stacks and an error is detected therein indicating a failure within one of the memory stacks, and in response to detecting the error, correct data is recovered based on the reliability sub-block.

A memory controller circuit interfaces with a plurality of random-access memory stacks. The memory controller circuit includes a plurality of memory channel controllers connected to the random-access memory stacks and a front-end controller connected to the plurality of memory channel controllers. The front-end controller receives a block of data for writing to the random-access memory stacks, divides the block of data into a plurality of sub-blocks, and creates a reliability sub-block based on the plurality of sub-blocks. The front-end controller directs selected ones of the memory channel controllers to cause the plurality of sub-blocks and the reliability sub-block each to be written to a different one of the random-access memory stacks. The front-end controller also directs selected ones of the memory channel controllers to cause the plurality of sub-blocks to be read from the random-access memory stacks. The front-end controller detects an error in the plurality of sub-blocks indicating a failure within one of the memory stacks, and in response to detecting the error, recovers correct data based on the reliability sub-block.

Figure 1:
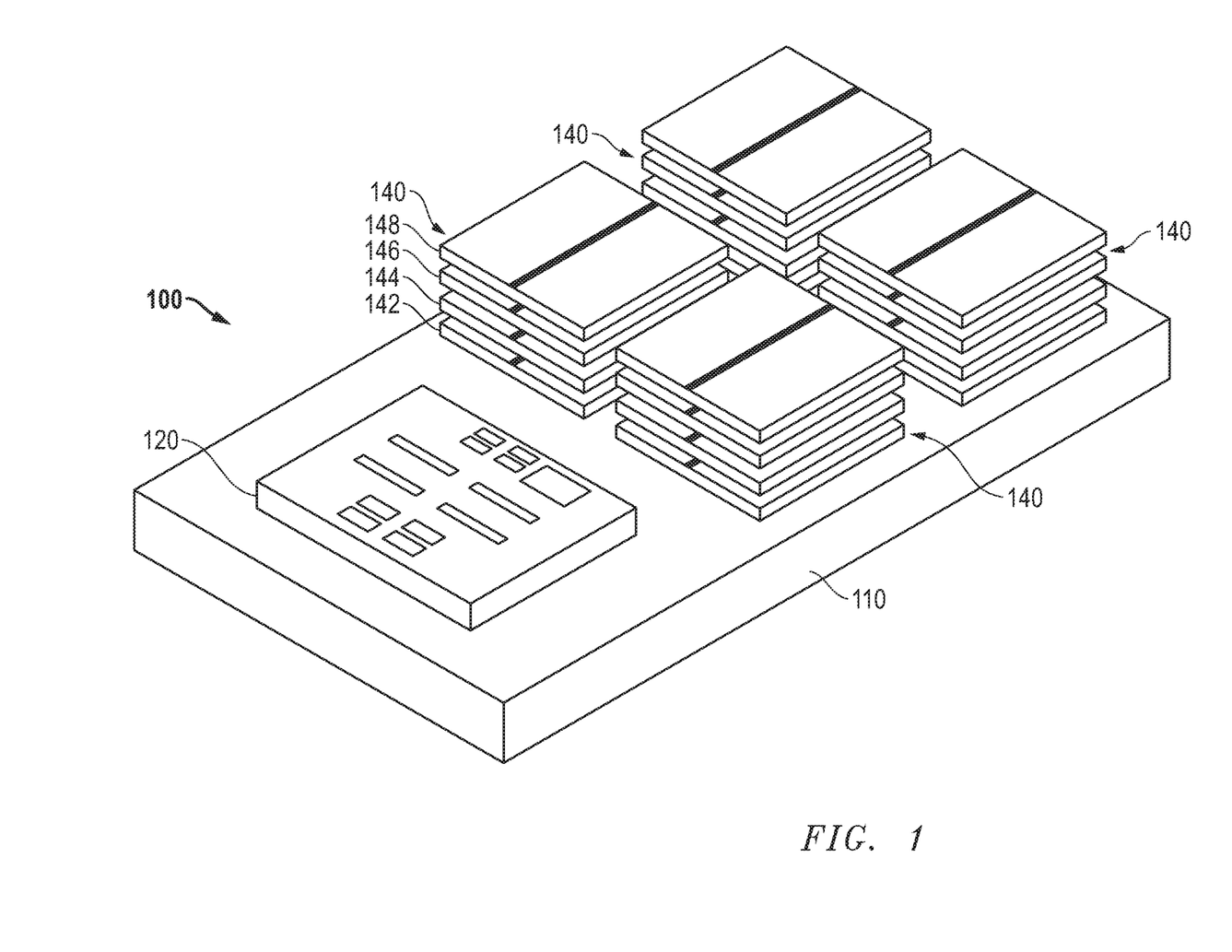
FIG. 1 illustrates in cutaway perspective diagram form the arrangement of semiconductors in a multi-chip module according to some embodiments.

FIG. 1 illustrates in cutaway perspective diagram form the arrangement of semiconductor chips in an example multi-chip module 100. The housing and filler of the package of multi-chip module 100 are missing to show the arrangement of semiconductor chips inside the package. An interposer 110, typically a silicon interposer, carries a multi-core processor chip 120 and multiple memory stacks 140, which are mounted along the interposer according to known techniques. Each memory stack includes a plurality of memory chips stacked atop each other, in this example four memory chips 142, 144, 146, and 148. Note that, in general, memory chip stacks 140 may include more or fewer memory chips than illustrated in FIG. 1. Each memory stack could have multiple memory channels. Memory stacks 140 may be constructed according to any suitable technique. Each individual memory chip of a memory chip stack 140 is connected to other memory chips of memory chip stack 140 using TSV technology or any other stacking technology for proper system operation. Each individual memory chip of memory chip stack 140 is also connected to processor chip 120, as desired for proper system operation, through suitable horizontal interconnects at one or more circuit layers of interposer 110. The techniques herein may be applied to other multi-chip systems in which multiple memory chip stacks 140 are connected to a processor chip 120. A system example would be a system in which memory chip stacks 140 are vertically stacked on top of a processor chip.

In operation, the components of multi-chip module 100 are combined in a single integrated circuit package, where memory chip stack 140 and processor 120 appear to the user as a single integrated circuit. For example, multi-chip module 100 may appear as an HBM memory module in which processor chip 120 includes a memory controller. Or, multi-chip module 100 may appear as a graphics processing unit (GPU) module in which processor chip 120 is a GPU employing the memory of stacks 140. Other types of multi-chip modules may benefit from the techniques herein, such as, for example, machine intelligence modules including a machine intelligence processor and associated memory. Further, the techniques herein are not limited to modules with processors, and may be employed with memory stacks connected to a processor in a different package.

Figure 2:
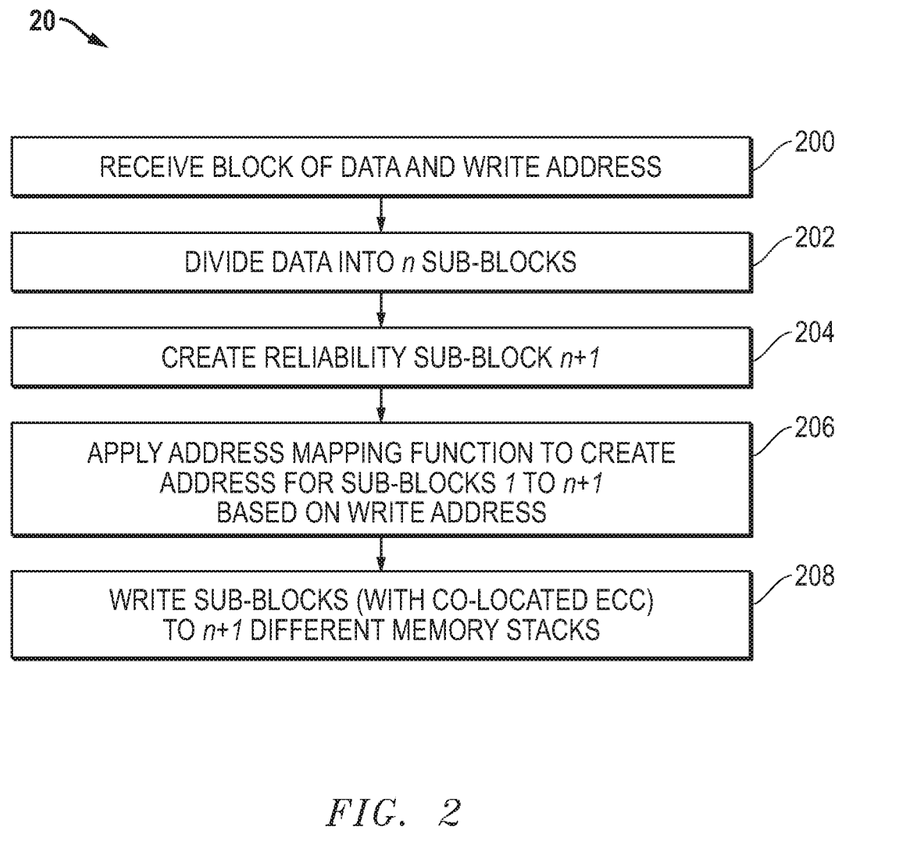
FIG. 2 illustrates in flow diagram form a process of preparing and writing data to memory in different memory stacks according to some embodiments.

FIG. 2 illustrates in flow diagram form a process 20 of preparing and writing data to memory in different memory stacks according to some embodiments. The process 20 may be employed in a multi-chip module such as that of FIG. 1, or may be employed in other circuits using multiple memory stacks. FIGS. 3-6 also illustrate portions of process 20 and will be referred to along with the flow diagram of FIG. 2. Generally, process 20 is executed by a memory controller, which may be part of a larger processor. Process 20 provides a way to increase the fault tolerance of single or multiple stacks of DRAM by introducing additional redundancy. Such redundancy is introduced in a way to reduce the potential bandwidth overheads.

Process 20 starts at action box 200 where a memory controller receives a block of data to be written to memory, along with a write address at which to write the data. The address is typically expressed in the address space of the host controller. The data blocks to be written are typically cache blocks. When a cache block needs to be written to the main memory, the memory front-end first divides the block in to a number n of equally sized sub-blocks, as shown at action box 202. In the example of FIGS. 3-6, the number of sub-blocks is two (n=2), which has some advantages for use with HBM modules, but this is not limiting and the number may be more than two. Next at action box 204, process 20 creates redundant data in the form of a reliability sub-block, referred to as sub-block n+1. The reliability sub-block may be created in any suitable way for creating redundant, error correction data.

Figure 3:
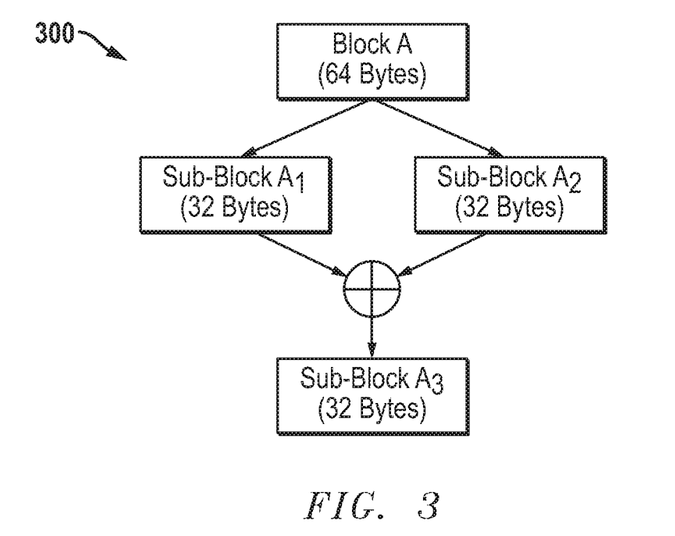
FIG. 3 shows in flow diagram form a process of creating reliability data according to some embodiments.

FIG. 3 shows in flow diagram form a process 300 of creating reliability data according to some embodiments. In this example, n=2, the original data sub-blocks are sub-blocks $A_1$ and $A_2$, and the reliability sub-block is sub-block $A_3$. The original n sub-blocks are logically XORed together and an additional redundant sub-block $A_3$ (n+1) is generated. Techniques other than bitwise XORing may be used to generate the redundant sub-block.

Referring again to FIG. 2, with the reliability sub-block generated at action box 204, process 20 needs to store all three sub-blocks. At action box 206, the process applies an address mapping function, such as that of FIG. 6, to create addresses based on the original write address at which to write sub-blocks 1 to n+1. The address mapping function should guarantee that addresses for sub-blocks 1 to n+1 are mapped to different memory stacks so data can be recovered in case one of the memory stacks are faulty. Using the generated addresses, process 20 at action box 208 then writes the sub-blocks to n+1 different memory stacks through different memory channel controllers. Action box 208 may also include generating and writing co-located ECC codes with the data, such as the data-co-located ECC syndrome bits included in the HBM2 standard. If this feature is used, the data-co-located ECC code is employed as the first layer of protection. Other versions may include other error detection codes or error correction codes. Further details of process 20 at action boxes 206 and 208 are further described with respect to FIGS. 4-7 below. Note that because n+1 sub-blocks are stored (n data sub-blocks and 1 reliability sub-block), the required redundant capacity is only 1/(n+1). Thus, if the combined physical capacity of the memory stacks is C (raw capacity), the actual memory capacity that the host can use for storing data is n/(n+1)*C (host-visible capacity).

Figure 4:
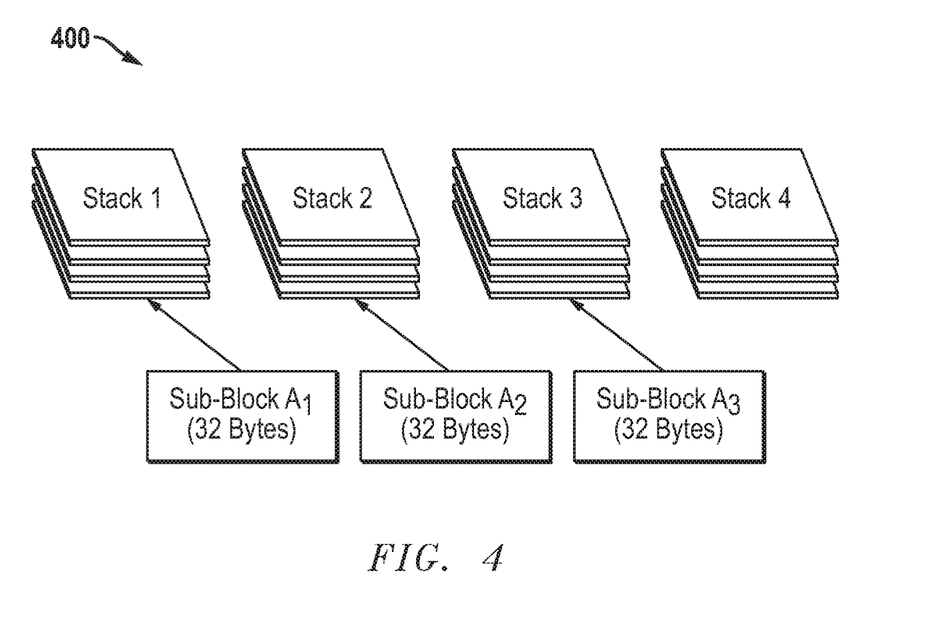
FIG. 4 illustrates in conceptual block diagram form the placement of data in memory stacks according to some embodiments.

FIG. 4 illustrates in diagram form the placement of data in memory stacks according to some embodiments. In addition to the redundant data, spatial redundancy is provided by making sure that all the different n+1 sub-blocks are distributed and stored in different stacks. As shown in the diagram 400, the different sub-blocks $A_1$-$A_3$ are written to separate stacks, labelled Stacks 1-3 in the four-stack system shown in the example. Thus, in case of failure of a stack, at most only one sub-block is inaccessible. The system can then use the rest of the n sub-blocks to recreate the original data. Note that any n out of the n+1 sub-blocks can be used to recreate the initial block.

Figure 5:
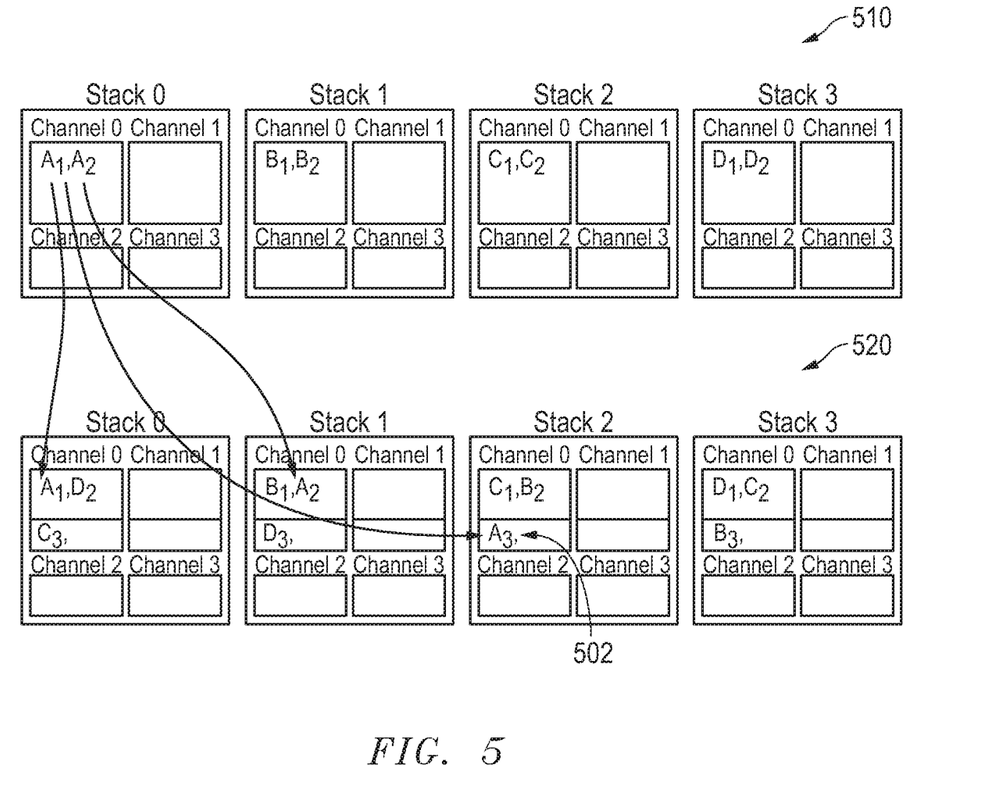
FIG. 5 illustrates in conceptual block diagram form the placement of data in memory channels according to some embodiments.

FIG. 5 illustrates in diagram form the placement of data in memory channels within the separate memory stacks according to some embodiments. This example diagram illustrates how the different sub-blocks are stored in different stacks, still using the example configuration of four stacks (s=4) and n=2. To implement this spatial redundancy, the process needs a mapping function as discussed with regard to action box 206 of FIG. 2. Many suitable mapping functions may be used, and different mapping functions may have different impacts on performance. Mainly, the remapping of blocks may cause an increase in page conflicts in main memory. Thus, this example mapping function maintains a similar locality as an unmodified memory system. Other variations of this mapping function can also provide sufficient spatial redundancy.

The upper diagram 510 presents how blocks would be mapped to an unmodified memory system (according to the original write address provided for the data). The lower diagram 520 show how the same blocks are mapped according to the mapping function. The first sub-block, for example $A_1$, is always located at the same position as the unmodified version. However, the second sub-block $A_2$ is mapped into the next stack, in a modulo fashion, but remains in the same relative channel, row and column position. This placement can be seen by the arrow showing $A_2$ remapped from Stack 0 to Stack 1 and keeping its same relative position in Channel 0 of the new stack. Additionally, some part of each channel's capacity is dedicated to store the redundant sub-block (⅓ for this specific example). The redundant sub-block is mapped in that dedicated storage in a third stack, again in a modulo fashion, as shown by the subblock $A_3$ mapped into dedicated redundant data storage area 502. Mapping arrows are shown for a single set of sub-blocks ($A_1$-$A_3$), however, other sets of subblocks are shown and the process may be used up to the full memory capacity taking into account n+1 sub-blocks. Diagram 520 of FIG. 5 omits most of the sub-blocks and their mapping as well as most of the channels in each stack for simplicity.

Figure 6:
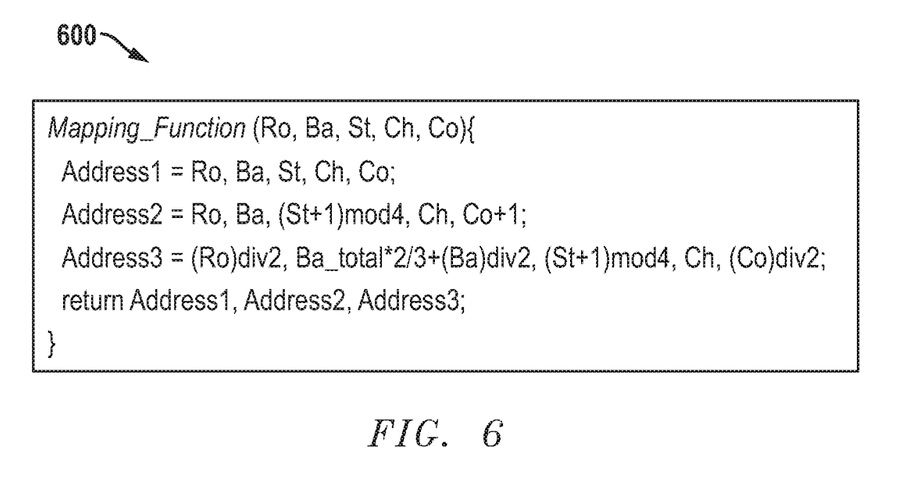
FIG. 6 shows in pseudo code listing form a memory address mapping function according to some embodiments.

FIG. 6 shows in pseudo code listing form a memory address mapping function 600 according to some embodiments. Function 600 achieves the mapping depicted in FIG. 5. The mapping function (F) is applied to the physical address that represents that specific block. This function F takes as an input a single address and produces n+1 different addresses at which the different sub-blocks (including the redundant sub-block) will be stored in the main memory. This example uses the number of stacks, s, chosen as s=4, and n=2, using only a single stack group. However, this function can be easily extended for any pair (n, s), where n≤s for any arbitrary number of stack groups.

To implement the mapping function 600, the design takes into account how the physical address space maps to the actual hardware (that is, the address mapping of the memory in the unmodified version as shown in FIG. 5 diagram 510). This example assumes the bits of the address have a "RoBaStChCo" format for the mapping, but other mapping formats and functions may be used. This convention means that moving from the least significant bits to the most significant bits of an address provides Column (Co), Channel (Ch), Stack (St), Bank (Ba) and Row (Ro) mapping of a block. For each block the first line of the function returns the same address for the first sub-block. For the second sub-block, the second line of the function updates the Ch-bits of the address by adding one modulo four. To create the redundant block address based on the original address, the third line of function divides the Ro bits by two, adjusts the Ba bits relative to the total number of banks, increases the stack bits by one, and divides the column bits by two.

Figure 10:
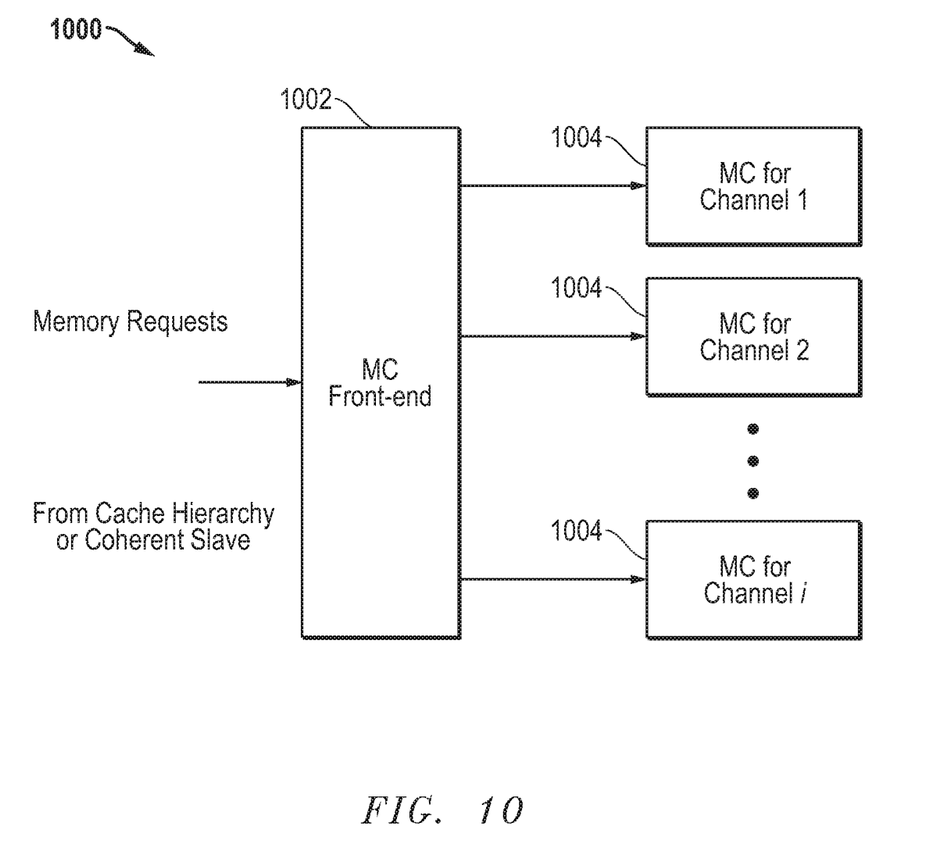
FIG. 10 illustrates in block diagram form a memory controller arrangement according to some embodiments.

In operation, the mapping is preferably performed by a front-end controller (an example of which is further described with respect to FIG. 10). When writing a cacheline to the memory, the front-end controller first calculates the new redundant sub-block n+1. Then it issues n+1 store requests to update all the sub-blocks to write the data to memory. Note that in terms of bytes this process only stores 1/n more data than an unmodified memory write.

Figure 7:
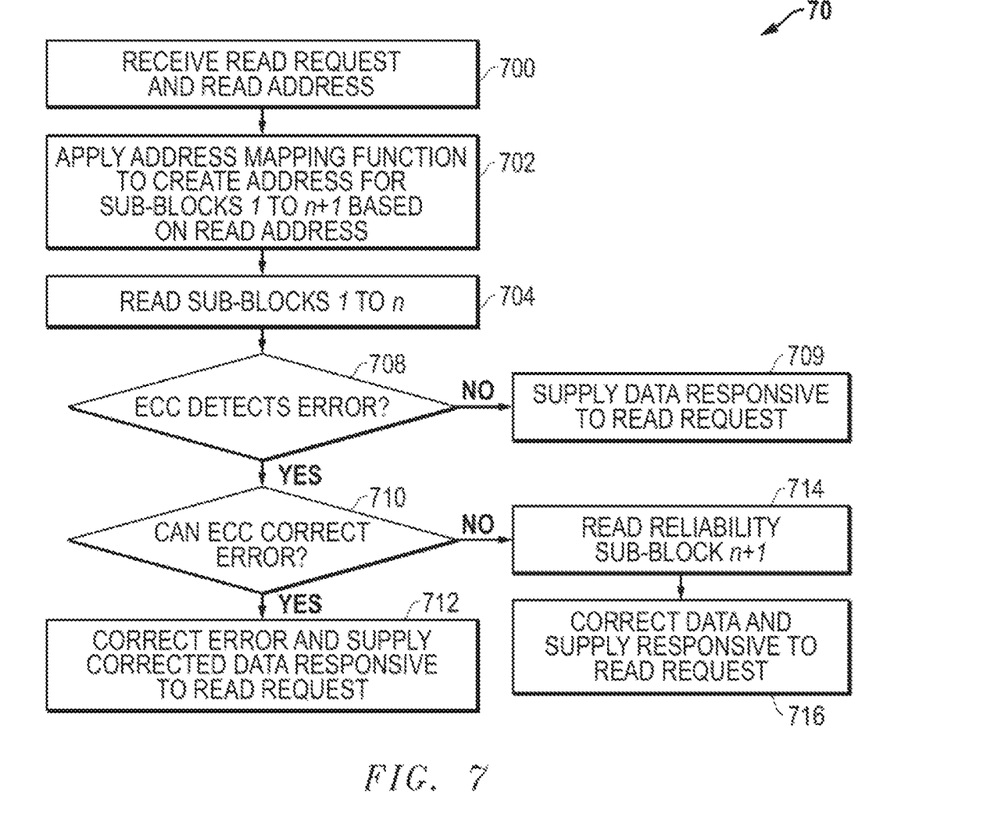
FIG. 7 shows in flow diagram form a process of reading data from memory according to some embodiments.

FIG. 7 shows in flow diagram form a process 70 of reading and recovering data from memory according to some embodiments. Process 70 begins at action box 700 where it receives a read request and a corresponding address. Next at action box 702, the same mapping function used to write the data is applied to create addresses to read the data, providing addresses for sub-blocks 1 to n+1 based on the read address received. At action box 704, process 70 reads sub-blocks 1 to n. Generally, it is noted that in the error free case, to reconstruct a cache block, only n sub-blocks are needed to be fetched from memory. Any subset of n of the n+1 sub-blocks may be used. By reading n sub-blocks process 70 may able to determine whether data is faulty or not, using co-located ECC data as shown at action box 708. If the co-located ECC scheme is not strong enough to detect all major multi-bit error variations or the co-located ECC is not used, then all n+1 sub-blocks should be read. For alternative versions in which no co-located ECC codes are used, the process goes from box 708 to box 714, and boxes 710 and 712 are not present. Referring again to process 70, if data is not faulty at box 708, this approach has no read bandwidth overhead, and the data is reconstructed from n sub-blocks and is supplied responsive to the read request at action box 709. If a correctable error is found as shown at action box 710, process 70 goes to action box 712, where the error is corrected, the corrected data is reconstructed, and the corrected data supplied responsive to the read request. In case of an uncorrectable fault at action box 710, the n+1 sub-block should be fetched as shown at action box 714, incurring a bandwidth overhead of (1/n)*100% for faulty cache blocks. Then at action box 716 the n+1 sub-block is used to correct and reconstruct the data, which is supplied responsive to the read request.

As can be understood from this description, when a cacheline (cache block) is to be read from main memory, process 70 issues n separate memory read requests. Note that n=≤s (the stack-group size). By using the mapping function, process 70 can be implemented to access any n out of the n+1 different sub-blocks. Given that the front-end controller may have some information regarding bandwidth contention, it may choose to access data from the memory channels that will respond "faster." After the read requests are issued, the front-end controller must wait for all the n sub-block read responses before providing the responsive data to system's cache hierarchy. Nevertheless, it is noted that the amount of data in terms of bytes that are read is the same as in the unmodified version for those cases in which n+1 sub-blocks do not need to be read.

As discussed above, the recovery procedure preferably uses memory stacks with data-co-located ECC. Other embodiments may provide alternative error detection or correction solutions, which have various tradeoffs. The data-co-located ECC code is employed as the first layer of protection against a stack fault. If the data-co-located ECC can detect and correct an error, then no more actions are required. In such case, the process does not need to access the n+1th sub-block, and does not incur any read bandwidth overhead. Since this condition is a common case in operation, the co-located ECC feature is particularly useful when combined with the techniques herein. If errors are detected but cannot be corrected by the data-co-located ECC, then the process has to issue an additional read request to acquire the n+1-th sub-block. The additional sub-block is used to recover the data.

Figure 8:
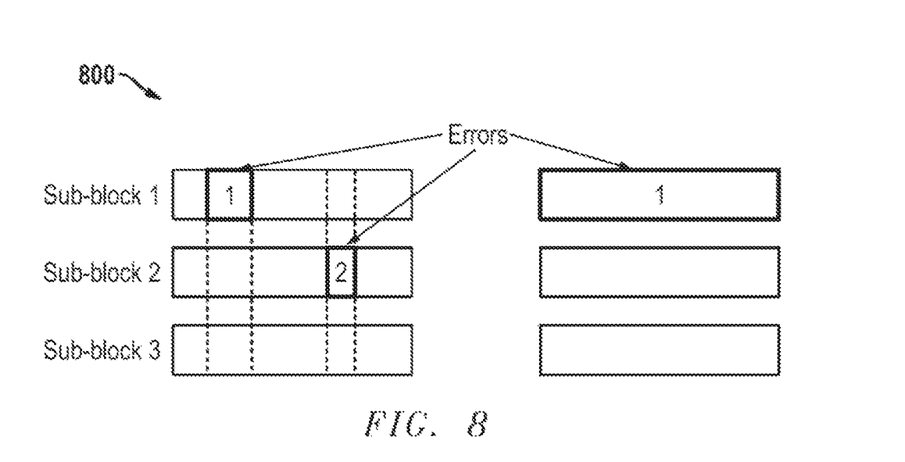
FIG. 8 illustrates in conceptual block diagram form presence of data errors in memory.

FIG. 8 illustrates in diagram form presence of data errors in memory, providing examples of how the additional sub-block can be used to recover data despite high granularity errors. Again, it is assumed that n=2 and s=4. In the example on the left side of the diagram 800, sub-block 1 has partial errors. By applying redundant reliability data of sub-block 3, in the example herein through XORing the sub-blocks 2 and 3, the process can recover the lost data of the sub-block 1. In the second example on the right side of the diagram 800, the whole of sub-block 1 is lost. Such a fault could be caused by a failure in the power supply of one of the stacks. Similarly, by combining sub-block 2 and the redundant reliability data of sub-block 3, the process can recover the entire lost sub-block 1.

Figure 9:
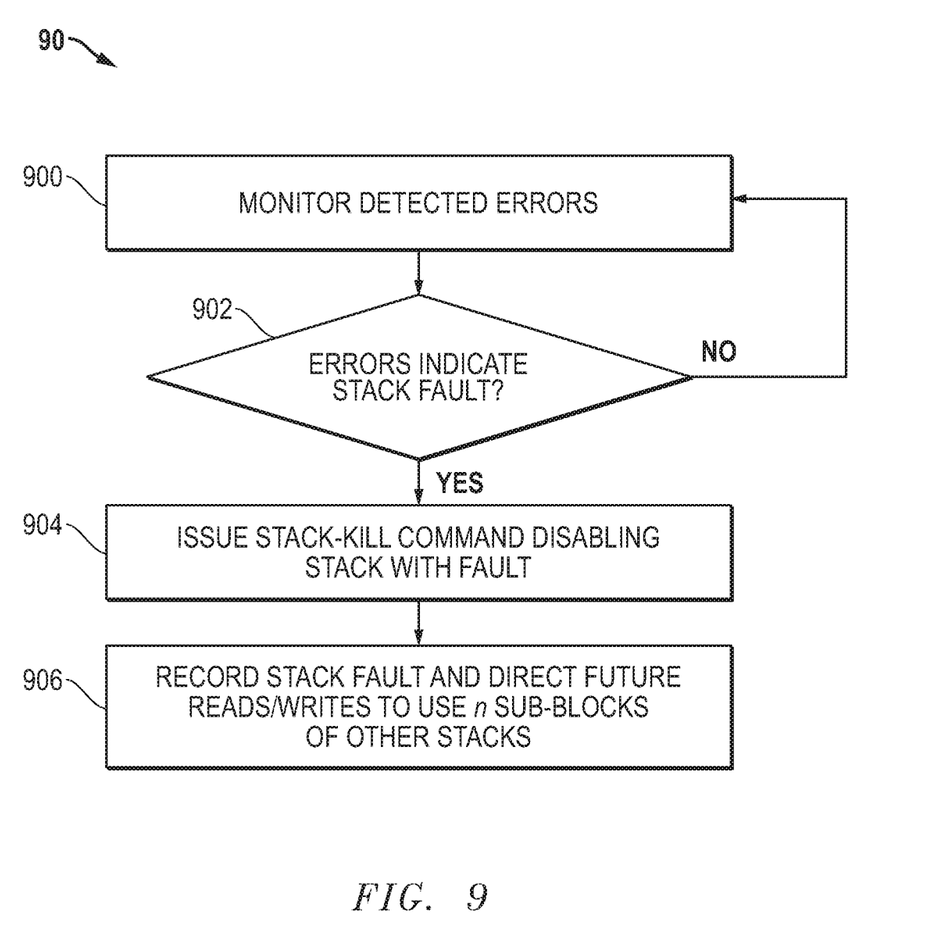
FIG. 9 shows in flow diagram form a process of handling a faulty stack according to some embodiments.

FIG. 9 shows in flow diagram form a process 90 of handling a faulty stack according to some embodiments. Process 90 is preferably conducted by a front-end controller such as that of FIG. 10. As shown at action block 900, the process monitors detected errors in ongoing memory access to the memory stacks, looking for conditions that indicate a faulty stack. Such conditions may be errors from multiple channels on a particular stack, faults in reading many locations from a particular memory stack, or other designated conditions. Process 90 may detect that a single stack is faulty, or a region of a single stack is faulty, or a set of addresses within a single stack is faulty at action box 902. If so, process 90 at action box 904 labels that memory stack or memory addresses as such, disabling access to the memory therein. Once addresses are disabled in such a manner, those addresses are not accessed again. Process 90 may also power off the stack if the whole stack is faulty. As shown at action box 906, if a block read requires accessing a sub-block from the faulty stack/addresses, the process instead issues a request for the other redundant sub-block. During a block write to the memory, process 90 ignores and never updates any sub-blocks in the faulty stack. By detecting and subsequently tagging a permanently faulty stack, process 90 avoids the bandwidth and energy overhead of accessing an additional sub-block from a faulty stack.

The use of the memory management techniques herein provides a large number of design options with many parameters for managing memory access to the stacks. One consideration is selecting the number n and s to achieve advantages of high fault tolerance with low overheads. Increasing n and s lowers the capacity overheads of the overall process.

The present inventors have selected n=2 as a good choice for HBM memory. HBM channels can provide 32B of data per memory transaction. Thus, some embodiments provide the sub-block size to be no less than 32 B in order to fully utilize HBM potentials. Additionally, the cache block size in some GPUs is 64 B. Selecting n=2 creates sub-blocks of size 32B provides an advantage of not wasting any of the HBM's bandwidth. Other stacked memories with smaller access granularity will allow for larger n and still maintain a similar advantage.

Another trade-off is the selection of the ECC code that is co-located in each stack. Having an ECC that can detect and correct errors can provide the benefit of easy and fast recovery during low granularity failures for which there is not a need to access the redundant sub-block. However, the detection capability of these codes is limited and thus it may limit the overall fault tolerance of the design. Another option is to have error detection only codes (e.g., CRC codes). These codes usually provide superior detection capabilities that can cover a variety of low to high granularity errors. However, such a code would require the process to access the redundant sub-block in order to recover, even from a low granularity failure. The memory management techniques herein can be used regardless of a specific code, increasing its flexibility.

Finally, in some embodiments, the techniques herein can be implemented in stacks with no data co-located error detection or correction codes. In such a case, however, the design will constantly have a (1/n)*100% bandwidth overhead because all n+1 sub-blocks must be accessed at all times, otherwise it cannot detect even single-bit errors in a stack. Additionally, the n+1 sub-blocks need to be logically XORed. If the resulting parity is zero then no errors were detected. In the case of errors, the result will be non-zero. Although the process cannot directly correct those errors, other alternative techniques, like checkpoints, may be employed in such designs for recovering.

FIG. 10 illustrates in block diagram form a memory controller 1000 according to some embodiments. A front-end controller 1002 is coupled between the host controller's cache and multiple memory channel controllers 1004. Front-end controller 1002 and the memory channel controllers 1004 together form a memory controller 1000. In operation, front-end controller 1002 receives the data and addresses for reads and writes, and performs most of the process functions described herein. It directs memory channel controllers 1004 to perform the required reads and writes of the sub-blocks. Generally, front-end controller 1002 ensures that sub-blocks are spread across different stacks through a mapping function as discussed with respect to the example processes above. It also collects all required sub-blocks from memory channels and reconstructs (and recovers, if needed) cache blocks from sub-blocks received from multiple stacks before forwarding the cache block data to the cache, as also discussed with respect to the example processes above. In addition, front-end controller 1002 labels and keeps track of faulty stacks, as also discussed with respect to the example processes above. Because the system makes uses of multiple memory channels, these functionalities are integrated in the front-end controller 1002, not each individual memory channel controller 1004 as depicted in FIG. 10. This arrangement provides the advantage of allowing the 3D stacked memory to be agnostic to the fact that the techniques herein are being implemented. Therefore, existing 3D stacked memory controllers and the memory stack designs do not need to be modified to use these techniques. Further, the techniques' configuration parameters may be altered by changing the firmware or hardware programming of front-end controller 1002, allowing vendors and users to adapt the techniques to their own system requirements and the capabilities and size of the memory stacks in a particular design.

The techniques herein may be used, in various embodiments, with any suitable fault tolerant products (e.g., server/datacenter products) that uses units of memory around a processor. Further, the techniques are broadly applicable for use with HBM and other stacked memory modules, any type of compute unit (GPU, CPU, custom ASIC, etc.) that uses multiple stacks of any type of 3D stacked DRAM.

The memory controller of FIG. 10 or portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which synthesizes the description to produce a netlist including a list of gates from a synthesis library. The netlist includes a set of gates that also represent the functionality of the hardware including integrated circuits. The netlist is then placed and routed to produce a data set describing geometric shapes to be applied to masks. The masks are then used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the memory channel controllers may be integrated with the memory stacks in various forms of multi-chip modules or vertically constructed semiconductor circuitry. Different types of error detection and error correction coding may be employed.

Accordingly, it is intended by the appended claims to cover all modifications of the disclosed embodiments that fall within the scope of the disclosed embodiments.

What is claimed is:

1. A memory system, comprising:
   a random-access memory including a plurality of memory stacks mounted along an interposer, each including a plurality of stacked random-access memory integrated circuit dies;
   a memory controller in an integrated circuit mounted along the interposer coupled to said random-access memory, the memory controller including a front-end controller and a plurality of memory channel controllers coupled between the front-end controller and the memory stacks, and operable to:
   receive a block of data for writing to the memory stacks;
   divide the block of data into a plurality of sub-blocks;
   create a reliability sub-block based on the plurality of sub-blocks;
   request that the plurality of sub-blocks and the reliability sub-block each be written to a different one of the memory stacks at a different respective address in each respective memory stack;
   request that the plurality of sub-blocks to be read from the plurality of memory stacks and detect an error therein indicating a failure within one of the memory stacks; and
   in response to detecting the error, recover correct data based on the reliability sub-block; and
   wherein the front-end controller is operable to produce a plurality of different addresses respectively for the plurality of sub-blocks and the reliability sub-block based on a single address for the block of data.

2. The memory system of claim 1, wherein the front-end controller is further operable to respond to a designated set of detected errors in the data read from the plurality of memory stacks, detected using error correction coding co-located with the plurality of sub-blocks, by disabling access for a designated one of the memory stacks such that it cannot be accessed for reading or writing, and making a record that the designated memory stack is disabled.

3. The memory system of claim 1, wherein the front-end controller is further operable to, in response to detecting the error, cause the reliability sub-block to be read.

4. The memory system of claim 1, wherein the memory controller detecting the error includes determining a presence of an uncorrectable error from error correction code data co-located with the plurality of sub-blocks.

5. The memory system of claim 1, wherein the memory controller is part of a microprocessor integrated circuit mounted on the interposer.

6. The memory system of claim 1, wherein the plurality of memory stacks are part of a multi-chip module including the memory controller.

7. A method of managing memory access, comprising:
   at a memory controller mounted to an interposer, receiving a block of data for writing to a random-access memory;
   dividing the block of data into a plurality of sub-blocks;
   creating a reliability sub-block based on the plurality of sub-blocks;
   requesting that the plurality of sub-blocks and the reliability sub-block each to be written to different ones of a plurality of memory stacks, each memory stack comprising a plurality of stacked random-access memory integrated circuit mounted to the interposer;
   requesting that the plurality of sub-blocks to be read from the plurality of memory stacks and detecting an error therein indicating a failure within one of the memory stacks;
   in response to detecting the error, recovering correct data based on the reliability sub-block; and
   wherein requesting that the plurality of sub-blocks and the reliability sub-block to be written further comprises producing a plurality of different addresses in each respective memory stack respectively for the plurality of sub-blocks and the reliability sub-block based on a single address received for the block of data.

8. The method of claim 7, further comprising, in response to detecting the error, causing the reliability sub-block to be read.

9. The method of claim 7, wherein detecting the error includes determining a presence of an uncorrectable error from error correction code data co-located with the plurality of sub-blocks.

10. The method of claim 7, wherein detecting the error is based on error detection code data co-located with the plurality of sub-blocks.

11. The method of claim 7, wherein requesting that the plurality of sub-blocks and the reliability sub-block to be written further comprises supplying each of the sub-blocks to a different memory channel controller configured for managing a respective memory channel of the memory stacks.

12. The method of claim 7, further comprising responding to a designated set of detected errors by disabling access for a designated one of the memory stacks, such that it cannot be accessed for reading or writing, and making a record that the designated memory stack is disabled.

13. The method of claim 7, wherein the reliability sub-block is created by a front-end controller coupled to receive a memory request from a system cache and send the memory request to a plurality of memory channel controllers adapted to control respective memory channels of the memory stacks.

14. A memory controller circuit for interfacing with a plurality of random-access memory stacks, comprising:
    a plurality of memory channel controllers coupled to the random-access memory stacks within a memory module; and
    a front-end controller within the memory module coupled to the plurality of memory channel controllers and operable to:
    receive a block of data for writing to the random-access memory stacks;
    divide the block of data into a plurality of sub-blocks;
    create a reliability sub-block based on the plurality of sub-blocks;
    direct selected ones of the memory channel controllers to write the plurality of sub-blocks and the reliability sub-block each to a different one of the random-access memory stacks at a different respective address in each respective memory stack;
direct selected ones of the memory channel controllers to read the plurality of sub-blocks from the random-access memory stacks;
detect an error in the plurality of sub-blocks indicating a failure within one of the memory stacks;
in response to detecting the error, recover correct data based on the reliability sub-block; and
wherein the front-end controller is operable to produce a plurality of different addresses respectively for the plurality of sub-blocks and the reliability sub-block based on a single address for the block of data.

15. The memory controller circuit of claim 14, wherein the front-end controller is further operable to, in response to detecting the error, cause the reliability sub-block to be read.

16. The memory controller circuit of claim 14, wherein the front-end controller is further operable to respond to a designated set of detected errors in the data read from the plurality of memory stacks, detected using error correction coding co-located with the plurality of sub-blocks, by disabling a designated one of the random-access memory stacks such that it cannot be accessed for reading or writing, and making a record that the designated memory stack is disabled.

17. The memory controller circuit of claim 14, wherein detecting the error includes determining a presence of an uncorrectable error from error correction code data co-located with the plurality of sub-blocks.

18. The memory system of claim 1, wherein the different respective address in each respective memory stack is provided by an address mapping function operable to reduce page conflicts as compared to using the same respective address for the plurality of respective sub-blocks and the reliability sub-block.

19. The method of claim 7, wherein the different respective address in each respective memory stack is provided by an address mapping function operable to reduce page conflicts as compared to using the same respective address for the plurality of respective sub-blocks and the reliability sub-block.

20. The memory controller circuit of claim 14, wherein the different respective address in each respective memory stack is provided by an address mapping function operable to reduce page conflicts as compared to using the same respective address for the plurality of respective sub-blocks and the reliability sub-block.

* * * * *